*S. W. Huntington,*
*Scissors.*

Nº 79,658. Patented July 7, 1868.

Witnesses
Edw.d Griffith
C. W. Baldwin

Inventor
S. W. Huntington
by his attorney
Frederick Curtis

United States Patent Office.

SAMUEL W. HUNTINGTON, OF AUGUSTA, MAINE.

Letters Patent No. 79,658, dated July 7, 1868.

IMPROVEMENT IN SCISSORS AND SHEARS.

The Schedule referred to in these Letters Patent and making part of the same.

TO ALL TO WHOM THESE PRESENTS SHALL COME:

Be it known that I, SAMUEL W. HUNTINGTON, of Augusta, in the county of Kennebec, and State of Maine, have invented a new and useful Improvement in Scissors and Shears; and do hereby declare the following to be a full, clear, and exact description thereof, due reference being had to the accompanying drawings, making part of this specification, and in which—

Figure 1:
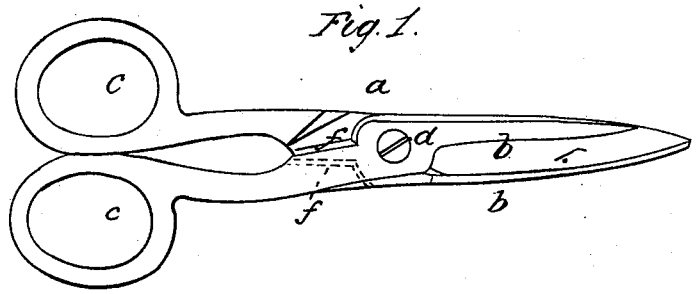

Figure 1 is a side elevation, and

Figure 2:

Figure 2 a vertical and transverse section of my invention.

The object of this invention is to provide a pair of shears or scissors, otherwise of ordinary construction, with an additional or auxiliary means of cutting a piece of whalebone, wire, or other hard substance which would tend to injure the primary blades.

The above-mentioned object is attained by making cutting-edges upon the blades of the scissors, upon both sides of the pivot of such blades, and using the inner and shorter arms of such blades for the purpose, as before observed, of cutting wire or other hard substances.

In the drawings above mentioned, $a$ denotes a pair of scissors of ordinary construction, of which $b\ b$ are the blades, $c\ c$ the handles, and $d$ the rivet.

In carrying out my invention, I reduce the inner edges of that portion of the blades $b\ b$ which extends between the pivot $d$ and the handles $c\ c$ in such manner as to form sharp edges thereon, and thus convert them into auxiliary cutting-blades, which may be used independently of the primary blades.

One advantage of my invention is the fact that I obtain an additional cutting means, without altering the general form of the scissors, and at very little if any increase of expense over the ordinary scissors.

Another advantage of my invention is the fact that scissors or shears of ordinary construction may, by little labor, be converted into the form, and so as to produce the results contemplated in my invention.

I claim the formation of auxiliary shear-blades $f$, upon the inner and opposite edges of that portion of the arms or blades of scissors and shears between the pivot and handle, or in rear of the pivot, as shown and set forth.

S. W. HUNTINGTON.

Witnesses:
 FRED. CURTIS,
 EDWARD GRIFFITH.